US012596087B2

(12) United States Patent
    Desmet

(10) Patent No.: US 12,596,087 B2
(45) Date of Patent: Apr. 7, 2026

---

(54) SYSTEM AND METHOD FOR MEASURING CONDENSATION AND/OR ADVANCE OF CORROSION

(71) Applicant: ISENSPRO NV, Leuven (BE)

(72) Inventor: Yves Gabriel Marie-Louis Desmet, Meise (BE)

(73) Assignee: ISENSPRO NV, Leuven (BE)

( * ) Notice: Subject to any disclaimer, the term of this patent is extended or adjusted under 35 U.S.C. 154(b) by 123 days.

(21) Appl. No.: 18/037,932

(22) PCT Filed: Nov. 24, 2021

(86) PCT No.: PCT/EP2021/082730
     § 371 (c)(1),
     (2) Date: May 19, 2023

(87) PCT Pub. No.: WO2022/112272
     PCT Pub. Date: Jun. 2, 2022

(65) Prior Publication Data
     US 2024/0011931 A1      Jan. 11, 2024

(30) Foreign Application Priority Data

Nov. 27, 2020    (NL) ...................................... 2026999

(51) Int. Cl.
     *G01N 27/22*       (2006.01)
     *F17D 5/00*        (2006.01)
     *G01N 27/24*       (2006.01)
(52) U.S. Cl.
     CPC ............. *G01N 27/228* (2013.01); *F17D 5/00* (2013.01); *G01N 27/223* (2013.01); *G01N 27/24* (2013.01)

(58) Field of Classification Search
     CPC .... G01N 27/228; G01N 27/223; G01N 27/24; G01N 17/02; F17D 5/00; G01M 3/0002; G01M 3/165; G01M 3/18
     See application file for complete search history.

(56) References Cited

U.S. PATENT DOCUMENTS

| | | | | |
|---|---|---|---|---|
| 5,389,216 A | * | 2/1995 | Balkanli | ................ G01N 17/02 |
| | | | | 205/775.5 |
| 11,060,993 B2 | * | 7/2021 | Redinger | ............. G01N 33/388 |

(Continued)

FOREIGN PATENT DOCUMENTS

| | | |
|---|---|---|
| EP | 3314244 A1 | 5/2018 |
| WO | 2015184514 A1 | 12/2015 |
| WO | 2016209072 A1 | 12/2016 |

OTHER PUBLICATIONS

International Search Report and Written Opinion mailed Feb. 10, 2022, for Application No. PCT/EP2021/082730 nine (9) pages).

*Primary Examiner* — Feba Pothen
(74) *Attorney, Agent, or Firm* — KDW Firm PLLC

(57)                ABSTRACT

A system for measuring a conduit surrounded by an insulator provided with a first conductor, a second conductor and one or more third conductors includes a control and measuring circuit configured to determine a value which is representative of the capacitive coupling between the first conductor and the second conductor and one or more of said third conductors. At least a first switching means is configured for electrically connecting the second conductor to a third conductor of said one or more third conductors in a first state and for electrically disconnecting the second conductors from the third conductor of said one or more of third conductors in a second state. A control means is configured for controlling the control and measuring circuit and the first switching means such that the measurements are performed in the first and second state of the first switching means.

20 Claims, 12 Drawing Sheets

(56) References Cited

U.S. PATENT DOCUMENTS 11,774,389 B2 * 10/2023 Vanhelmont ....... G01N 33/0031
324/664
2020/0300751 A1 9/2020 Desmet

* cited by examiner

SYSTEM AND METHOD FOR MEASURING CONDENSATION AND/OR ADVANCE OF CORROSION

This application is a national stage filing under 35 U.S.C. 371 of pending International Application No. PCT/EP2021/082730, filed Nov. 24, 2021, which claims priority to Netherlands Patent Application No. 2026999, filed Nov. 27, 2020, the entirety of which applications are incorporated by reference herein.

The present invention relates to a system for measuring of a conduit surrounded by an insulator provided with a first conductor, a second conductor and one or more third conductors. Moreover, the invention relates to a system for measuring condensation and/or advance of corrosion near conductors. In addition, the invention relates to a measurement instrument for measuring a conduit surrounded by an insulator provided with a first conductor, a second conductor and an additional conductor arranged between the first conductor and the second conductor, wherein the additional conductor is intended to be grounded. Further, the invention relates to a switching instrument for electrically connecting a conductor and another conductor in a first state and for electrically disconnecting said first conductor and second conductor of said one or more conductors in a second state.

For transport of some fluids it is important that conduits are subject as little as possible to thermal losses. The conduits for transporting such fluids colder than the dew point temperature are therefore typically thermally insulated. Also, conduits for transporting warm liquids are thermally insulated. This takes place by enclosing for instance pipelines with insulating shells, optionally provided with a vapour barrier.

There is however the danger of condensation in such installations. Because the installations are typically exposed to ambient air, and if there is a leak in the vapour barrier, the moisture in the ambient air can condense onto the conduit at the contact surface with the inner side of the insulation. Over a period of time such condensed moisture can result in corrosion of the conduit, whereby the conduit is damaged (the metal corrodes and the conduit eventually loses its effectiveness, strength and watertightness). The term corrosion under insulation (CUI) is typically used to describe this. It is difficult to remove such condensed moisture and replacing a complete installation is expensive. Condensation is therefore best detected before the actual corrosion occurs, or in any case as early as possible, so that a less expensive partial replacement of the insulation is possible.

Known systems for measuring condensation on the conduit and the advance of corrosion as a result of condensation make use of thermal cameras for detecting locations with deviating thermal patterns. This solution is not efficient however because it is expensive and cumbersome and for instance does not allow detection of heat and/or cold losses in blind spots. The interpretation of such thermal detection is moreover difficult: it is not clear whether a heat or cold loss can be attributed to a locally thinner insulation or to a vapour barrier leakage, and thermal detection inaccuracies are possible due to thermal reflection on a shiny surface.

In order to solve these problems International patent application WO2015184514 A1, in the name of the same applicant as the present patent application, provides a device for measuring condensation and/or advance of corrosion of an electrically conductive conduit. An insulator extends around the conduit as well as at least one electrical conductor. The conductor is arranged such that at least a portion of the insulator lies between the conduit and said conductor.

The conduit forms, in this way, a first pole of a capacitor. The conductor forms a second pole of this capacitor. The portion therebetween forms a dielectric. A measuring instrument is provided to determine for the conductor a value representative of the capacitive action of the corresponding capacitor.

An object of the of embodiments of the present invention is to provide a system allowing to accurately detect the location of condensation and/or corrosion, especially when condensation and/or corrosion occur at different locations along the conduit, and in part a system which is easy to install and cost-efficient.

Embodiments of the invention provide for this purpose a system for measuring a conduit surrounded by an insulator provided with a first conductor, a second conductor and one or more third conductors. The system comprises a control and measuring circuit configured to determine a value which is representative of the capacitive coupling between the first conductor and the second conductor and one or more of said third conductors. The system further comprises at least a first switching means configured for electrically connecting the second conductor to a third conductor of said one or more third conductors in a first state and for electrically disconnecting the second conductor from the third conductor of said one or more of third conductors in a second state. The system further comprises a control means configured for controlling the control and measuring circuit and the first switching means such that the measurements are performed in the first and second state of the first switching means.

This solution allows to control a measuring area of the control and measuring circuit. The measuring area of the control and measuring circuit is controllable by controlling the state of the switching means. In the first state the measuring area lies between the first conductor, on the one hand, and the second and third conductors, on the other hand. The measuring area is thus large and allows to monitor a large portion of the conduit. In the second state of the switching means, the third conductor is electrically disconnected. In this way the measuring area is situated mainly between the first and the second conductor. The measuring area is thus reduced. If only the measurement in the first state indicates a problem and not the measurement in the second state, it can be derived that the problem will be situated close to the third conductor. If both measurements in the first and the second state indicate a problem, it can be derived that the problem is situated close to the first and second conductor. The system thus allows to more accurately measure a conduit by controlling the state of the switching means.

The skilled person understands that if more than one third conductor is present, a further switching means may be added between the adjacent third conductors or between the second and the further third conductor to further improve the accuracy.

Preferably, the system further comprises one or more fourth conductors and a second switching means configured for electrically connecting the first conductor to a fourth conductor of said one or more fourth conductors in a first state and for electrically disconnecting the first conductor from the fourth conductor of said one or more fourth conductors in a second state. In this way detection of problems can be further extended along a substantial length of the insulator. Preferably, the first conductor is arranged between the one or more fourth conductors and the second conductor. Preferably, the second conductor is arranged between the one or more third conductors and the first conductor. In other words, the one or more third conductors may be extending in a longitudinal direction at a first side of the first and second conductor, and the one or more fourth conductors may be extending in a longitudinal direction on a second side of the first and second conductor. Such an arrangement allows to measure a greater portion of the conduit using the control and measuring circuit, in particular in two directions opposite to each other.

Preferably, the control means is configured to wirelessly control at least the first switching means. This solution allows to reduce the wiring required to control the switching means in addition to reducing installation effort and time. Additionally, the convenience of use can be increased. Also, central control can be made possible.

Preferably, the system further comprises a switching means housing accommodating the first switching means, a first fixation means attached to the switching means housing and a second fixation means attached to the switching means housing, wherein the first fixation means and the second fixation means are configured to be arranged on the second conductor and the third conductor of said one or more third conductors, respectively. Preferably, the first switching means housing comprises a first housing portion and a second housing portion being connected to each other, wherein the first fixation means and the second fixation means are attached to the first housing portion and the second housing portion, respectively. More preferably, the switching means housing further comprises a bridging portion connecting the first housing portion and the second housing portion, wherein the bridging portion is preferably a deformable duct. The bridging portion allows to span greater intermediate areas between two conductors. An advantage of having a deformable duct as the bridging portion is that said duct can be stretched and flexed into a correct shape, thus avoiding complex custom fittings on-site. In this way the installation of the switching means, and by extension the system, is further simplified.

Preferably, the system further comprises a wireless receiving means configured for wirelessly receiving a control signal from the control means and for controlling the first switching means in accordance with the control signal.

Preferably, the system further comprises a control and measuring circuit housing configured for accommodating the control and measuring circuit, a first fixation means attached to the control and measuring circuit housing and a second fixation means attached to the control and measuring circuit housing, wherein the first fixation means and the second fixation means are configured to be arranged on the first conductor and the second conductor, respectively. Similarly, the advantages for the switching means housing apply for the corresponding control and measuring circuit housing. In other words, this solution allows to easily mount the control and measuring circuit on a conductor, reduce installation time and effort. The installation of the system as a whole is thus further simplified.

Preferably, the control means is accommodated in the control and measuring circuit housing and comprises an antenna for wireless communication with the wireless receiving means.

Preferably, the first fixation means and the second fixation means comprise a first and a second clamping part from an electrically conductive material, respectively, wherein said first and second fixation means are configured to clamp said first and second clamping part against the first and the second conductor or against the second and the third conductor, respectively. By clamping the electrically conductive clamping part against the conductor, an electrical connection is formed in a simple way. By electrically connecting terminals of, for example, the switching means to the first and second clamping part, said switching means is electrically coupled to the corresponding conductors in a simple manner. Also, this allows to retroactively fit the system on existing conduits without performing intrusive installation techniques, such as screw fitting. This solution allows, in other words to reduce the steps for installation of the system. Preferably, the first and second clamping part are substantially omega shaped and each have two clamping flanges configured for interlockingly engaging a strap surrounding a circumference of the insulator.

Preferably, the switching means housing and/or the control and measuring circuit housing is at least partially manufactured from a corrosion-resistant material such as stainless steel, galvanized steel, aluminium or a plastic. This advantageously improves the longevity of the switching means housing and/or the control and measuring circuit housing.

Preferably, the system further comprises at least a further switching means for electrically interconnecting the third conductor to a further third conductor of the one or more third conductors. This has the advantage that the measurement area can be further extended and accuracy can be further improved.

Preferably, the first conductor, the second conductor and the one or more third conductors are each embodied as an electrically conductive coating or cladding for the insulator. This has the advantage that the system can be installed when insulating a conduit, thus requiring fewer operational steps.

Preferably, the first conductor, the second conductor and the one or more third conductors are each shaped as at least a portion of an electrically conductive sleeve configured to cover at least a portion of the insulator. This has the advantage that each of the conductors can cover a greater surface area than in some other forms (such as cords or elongate plates), such that the capacity can also be greater.

The skilled person will appreciate that advantages and objectives similar to those for the system apply for the corresponding method, the measurement instrument and the switching device, mutatis mutandis.

According to a further aspect a measurement instrument is provided for measuring a conduit surrounded by an insulator provided with a first conductor, a second conductor and an additional conductor arranged between the first conductor and the second conductor, wherein the additional conductor is intended to be grounded. The measurement instrument comprises a control and measuring circuit configured to determine, in a first state, a first value which is representative of the capacitive coupling between the second conductor and the conduit and to determine, in a second state, a second value which is representative of the capacitive coupling between the first conductor and the second conductor. In practical applications, a conduit is typically supported at regular intervals by a conduit support. The conduit support is grounded and because the additional conductor at least partly surrounds the insulator and is in contact with the conduit support, said additional conductor is electrically connected to the grounded conduit support. In other words, the additional conductor is grounded. In the first state, a measurement area of the measurement instrument is situated between conduit and the second conductor. By extension, the measurement area is situated between the additional conduit and the second conductor because the additional conduit is electrically connected to the conduit via the conduit support. In the second state the measurement area of the measurement instrument is situated mainly between the first conductor and the second conductor. If a measurement in the second state indicates a problem, it can be derived that the problem will be situated close to the first, second, and additional conductor. When the measurement instrument performs a measurement in the first state, after the measurement in the second state and said measurement in the first state does not indicate a problem, it can be derived that the problem is situated near the first conductor. If a measurement indicates a problem in the first state but a consecutive measurement in the second state does not indicate a problem, it can be derived that the problem is situated near the additional conductor and the second conductor. The measurement instrument thus allows to accurately determine the location of a problem, such as corrosion and/or condensation, near conduit supports.

Preferably, the control and measuring circuit comprises a measuring means having a first pole and a second pole, a first branch, a second branch and an additional branch connectable to the first conductor, the second conductor and the additional conductor, respectively; wherein the second branch is operably connected to the second pole, and wherein a switching circuit has a first terminal connected to the first pole, a second terminal connected to the first branch and an additional terminal connected to the additional branch, wherein the switching circuit is configured to connect the first terminal to the second terminal in a first switching state and to the additional terminal in a second switching state. More preferably, the additional branch comprises a resistive component, such as a resistor. More preferably, the resistive component has a value larger than 100 kΩ, preferably larger than 300 kΩ and preferably smaller than 1000 kΩ.

Preferably, the measurement instrument comprises a control means configured for controlling the control and measuring circuit such that the measurements are performed in the first or second state.

Preferably, the control and measuring circuit is further configured to determine, in a third state, a third value which is representative of the capacitive coupling between the first conductor and the conduit. In the third state, a measurement area of the measurement instrument is situated between the first conductor and the second conductor. Similarly to the above, if a measurement in the second state indicates a problem, it can be derived that the problem will be situated close to the first, second, and additional conductor. When the measurement instrument performs a measurement in the third state, after a measurement in the second state, and said measurement in the third state does not indicate a problem, it can be derived that the problem is situated near the second conductor. Moreover, if a measurement in each of the first, second and third state indicates a problem, it can be derived that the problem is situated near the additional conductor. In this way, the determination of the location of a problem such as corrosion and/or condensation, near conduit supports is further improved.

Preferably, the measurement instrument comprises a measurement instrument housing configured for accommodating the control and measuring circuit, a first fixation means, a second fixation means and an additional fixation means respectively attached to the measurement instrument housing, wherein the first fixation means, the second fixation means and the additional fixation means are configured to be arranged on the first conductor, the second conductor and the additional conductor, respectively. More preferably, the measurement instrument housing comprises a first housing portion, a second housing portion, a control and measuring circuit housing portion accommodating the control and measuring circuit and a bridging portion connecting the first housing portion to the control and measuring circuit housing portion, wherein the first fixation means, the second fixation means and the additional fixation means are attached to the first housing portion, the second housing portion and the control and measuring circuit housing portion, respectively. More preferably, the bridging portion is a deformable duct.

Preferably, the measurement instrument further comprises a first fixation means attached to the first housing portion, a second fixation means attached to the second housing portion, and an additional fixation means attached to the third housing portion, wherein the first fixation means, the second fixation means and the additional fixation means are configured to be arranged on the first, second and additional conductor, respectively. Preferably, the first fixation means, the second fixation means and the additional fixation means comprise a first, a second and an additional clamping part from an electrically conductive material, respectively, wherein said first, second and additional fixation means are configured to clamp said first, second and additional clamping part against the first, the second and the additional conductor, respectively. More preferably, the first, second and third clamping part are substantially omega shaped and each have two clamping flanges configured for interlockingly engaging a strap surrounding a circumference of the insulator, wherein each strap clamps the corresponding clamping part against the respective conductor.

According to a further aspect a method for measuring a conduit surrounded by an insulator provided with a first conductor, a second conductor and one or more third conductors, comprising arranging a control and measuring circuit between the first conductor and the second conductor, arranging at least a first switching means between the second conductor and a third of said one or more third conductors, performing a capacitive measurement with the control and measuring circuit in a first state wherein the second conductor and the third conductor of said one or more third conductors are electrically connected by at least the first switching means or in a second state wherein the second conductors and the third conductor of said one or more of third conductors are electrically disconnected by at least the first switch.

According to an even further aspect a switching means is provided, preferably for use in the system as described hereabove, for electrically connecting at least a first conductor and a second conductor of one or more conductors in a first state and for electrically disconnecting said first conductor and second conductor of said one or more conductors in a second state, comprising a switching means, a switching means housing accommodating the switching means, a first fixation means attached at a first end of the switching means housing and a second fixation means attached at a second end the switching means housing, wherein each of the first fixation means and the second fixation means comprise a first and a second clamping part from an electrically conductive material, respectively, wherein said first and second fixation means are configured to clamp said first and second clamping part against the first conductor and the second conductor, respectively. Preferably, the first and second clamping part are substantially omega shaped and each have two clamping flanges configured for interlockingly engaging a strap surrounding a circumference of the insulator, wherein each strap clamps the corresponding clamping part against the first conductor and the second conductor, respectively.

Preferably, the switching instrument comprises a switching means housing comprises a first housing portion and a second housing portion being operably connectable to each other, wherein the first fixation means and the second fixation means are attached to the first housing portion and the second housing portion, respectively.

Preferably, the switching means housing further comprises a bridging portion for operably connecting the first housing portion and the second housing portion, wherein the bridging portion is preferably a deformable duct.

Preferably, the switching instrument further comprising a wireless receiving means accommodated in the switching means housing, wherein the switching means housing comprises a non-metallic part and the wireless receiving means is arranged close to the non-metallic part of the switching means housing Preferably, the switching instrument further comprises a non-conductive coupling means configured for coupling the first and second fixation means in an electrically insulated way to the switching means housing.

According to yet a further aspect a use of a switching means in the system as described here above is provided.

BRIEF DESCRIPTION OF THE FIRGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
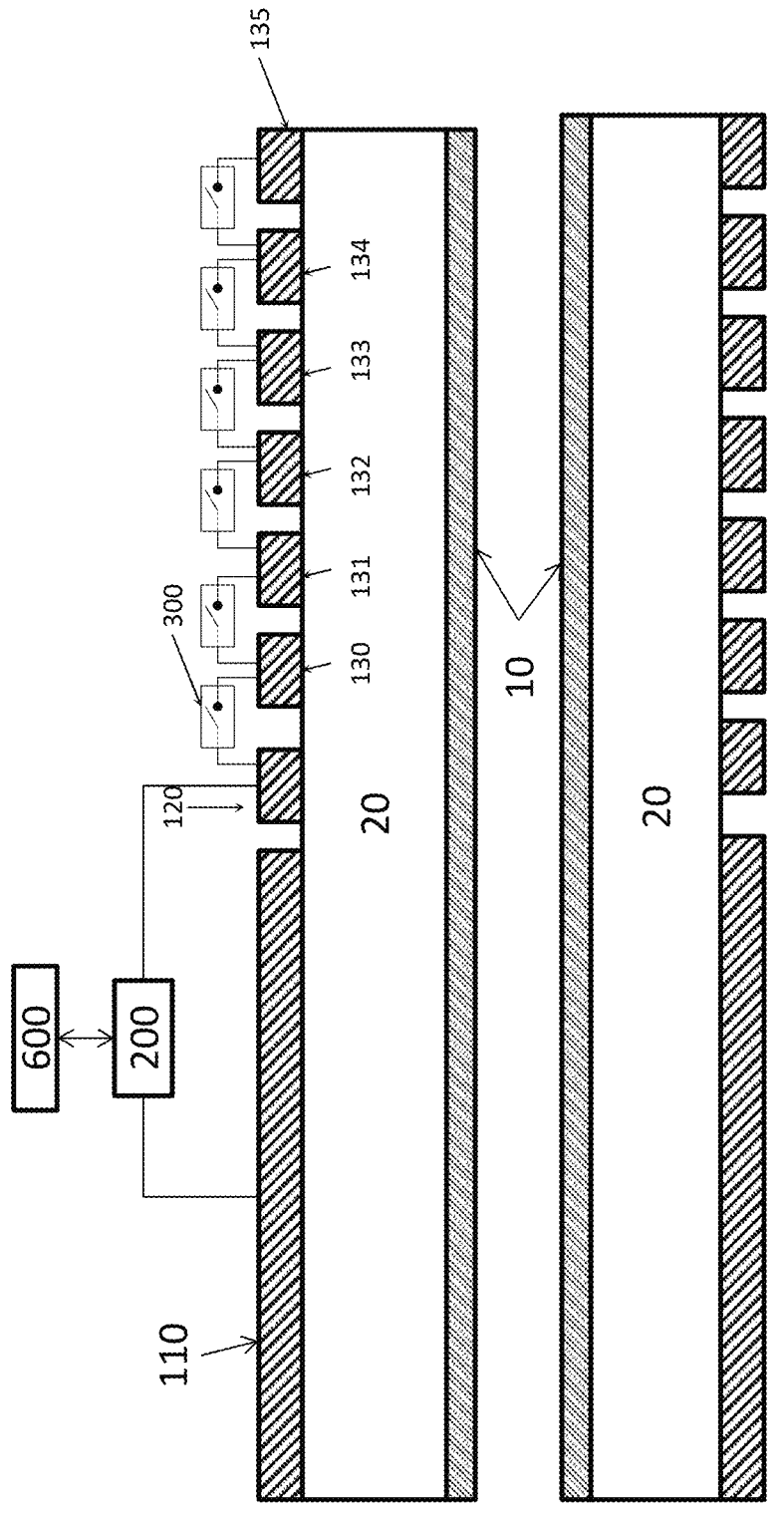
FIG. 1 is a schematic representation of an embodiment of a system, seen in longitudinal section along the longitudinal direction of a conduit.

The same or similar elements are designated in the drawing with the same reference numeral.

FIG. 1 shows a schematic representation of an embodiment of a system in a longitudinal section along the longitudinal direction of a conduit 10. The figure shows conduit 10 in a cross-section along its longitudinal axis, although the skilled person will appreciate that other embodiments of the invention can also be applied in differently shaped conduits. The conduit 10 may optionally be provided with a surface layer (not shown). The surface layer may be e.g. any one of the following: a coating, a cover layer, an oxidation layer. For example, the surface layer may be a corrosion resistant layer, a protective layer, etc. The surface layer may be a layer which is adhered to the conduit, or may be a layer which is not adhered to the conduit, e.g. a separate foil. A thickness of the surface layer is typically smaller than a wall thickness of the conduit. For example, the surface layer may have a thickness which is smaller than 10 mm, preferably smaller than 9 mm, more preferably smaller than 8 mm.

An insulator 20 extends around conduit 10 or, in other words, surrounds the conduit 10. The insulator 20 can be configured for thermal insulation, but alternatively or additionally also for acoustic insulation or fire protection. The insulator 20 can, for instance, comprise pre-formed shells which are clamped or fastened around conduit 10, or can for instance comprise mats which are wrapped around conduit 10. Moreover embodiments of the invention can be applied with all types and forms of insulators. Further even, the surface layer of the conduit may also be considered as an insulator when the surface layer is a non-conductive surface layer.

The insulator 20 is provided with a first conductor 110, a second conductor 120, and a plurality of third conductors 130, 131, 132, 133, 134, 135. Those skilled in the art will appreciate that embodiments of the invention can also be applied to an insulator provided with a first, second, and one third conductor. In other words, one or more third conductors may be provided. The first, second and third conductors are arranged at a distance of the conductor. According to the illustrated preferred embodiment, the first conductor 110, the second conductor 120, and the third conductors 130, 131, 132, 133, 134, 135 are preferably arranged on the insulator 20 such that at least a portion of the insulator 20 lies between the conduit 10, the first conductor 110, the second conductor 120 and each of the third conductors 130, 131, 132, 133, 134, 135, respectively. Although the first conductor 110, the second conductor 120, and the third conductors 130, 131, 132, 133, 134, 135 are shown to be arranged on the insulator 20, the skilled person will appreciate that the first, the second and/or the one or more third conductors may be embedded in the insulator 10.

The first, second and one or more third conductors are adjacently arranged, seen in the longitudinal direction of the conduit 10, wherein the second conductor 120 is preferably arranged between the one or more third conductors 130, 131, 132, 133, 134, 135 and the first conductor 110.

The system further comprises a control and measuring circuit 200. The control and measuring circuit 200 is configured to determine a value which is representative of the capacitive coupling between the first conductor 110 and the second conductor 120 and the one or more third conductors 130, 131, 132, 133, 134, 135. The first conductor 110 forms a first pole of a capacitor (not shown). The second conductor and the one or more third conductors 130, 131, 132, 133, 134, 135 form a second pole of the capacitor (not shown). The portion between the first conductor 110 and the second conductor and the one or more third conductors comprises a capacitive coupling therebetween. The portion of insulator 20 lying between the two poles can serve at least partly as a dielectric for the capacitor formed by the first conductor 110 and the second conductor 120 and the one or more third conducts 130, 131, 132, 133, 134, 135.

The second conductor 120 and a third conductor 130 of the one or more third conductors, 130, 131, 132, 133, 134, 135 are connected via at least a first switching means 300. The first switching means 300 is configured for electrically connecting the second conductor 120 to the third conductors 130 in a first state. Moreover, the first switching means 300 is configured for electrically disconnecting the second conductor 120 from the third conductors 130 in a second state. Additionally, one or more further first switching means 300, in the illustrated example six switching means 300, may be arranged to respectively interconnect two further third conductors 130, 131, 132, 133, 134, 135 of the one or more third conductors. For example, a further switching means may be provided to electrically interconnect third conductor 130 to the third conductor 131, etc. It will be apparent that more or less third conductors and/or switching means 300 may be provided. According to a preferred embodiment the switching means 300 is normally closed. In this way, the measurement area is large under normal circumstances which allow to detect a problem over a large portion of the conduit without complex control methods. Once a problem is detected, the switching means can be controlled in order to accurately determine the location of the problem.

The system further comprises a control means 600 configured for controlling the control and measuring circuit 200 and the first switching means 300 such that the measurements are performed in the first or second state of the first switching means 300. This solution allows to control a measuring area of the control and measuring circuit 200. The measuring area of the control and measuring circuit 200 is controllable by controlling the state of the switching means 300. In the first state the measuring area is situated between the first conductor 110, on the one hand, and the second 120 and third conductors 130, on the other hand. The measuring area is thus large and allows to monitor a large portion of the conduit 10. In the second state of the switching means 300, the third conductor 130 is electrically disconnected. In this way, the measuring area is situated mainly between the first and the second conductor. The measuring area is thus reduced. If only the measurement in the first state indicates a problem and a measurement in the second state does not indicate a problem, it can be derived that the problem will be situated close to the third conductor 130. If both measurements in the first and the second state indicate a problem, it can be derived that the problem is situated close to the first and second conductors 110. The system thus allows to more accurately measure a conduit by controlling the state of the switching means. It will be immediately apparent that the controlling of the switching means 300 and the performing of the measurements may be executed irrespective of whether a problem such as condensation and/or corrosion is detected. The skilled person will appreciate that, although the switching means 300 are shown to electrically connect or disconnect the one or more third conductors in series, other embodiments can be envisaged with regards to such interconnections, as will be elaborated in conjunction with FIG. 3.

Figure 3:
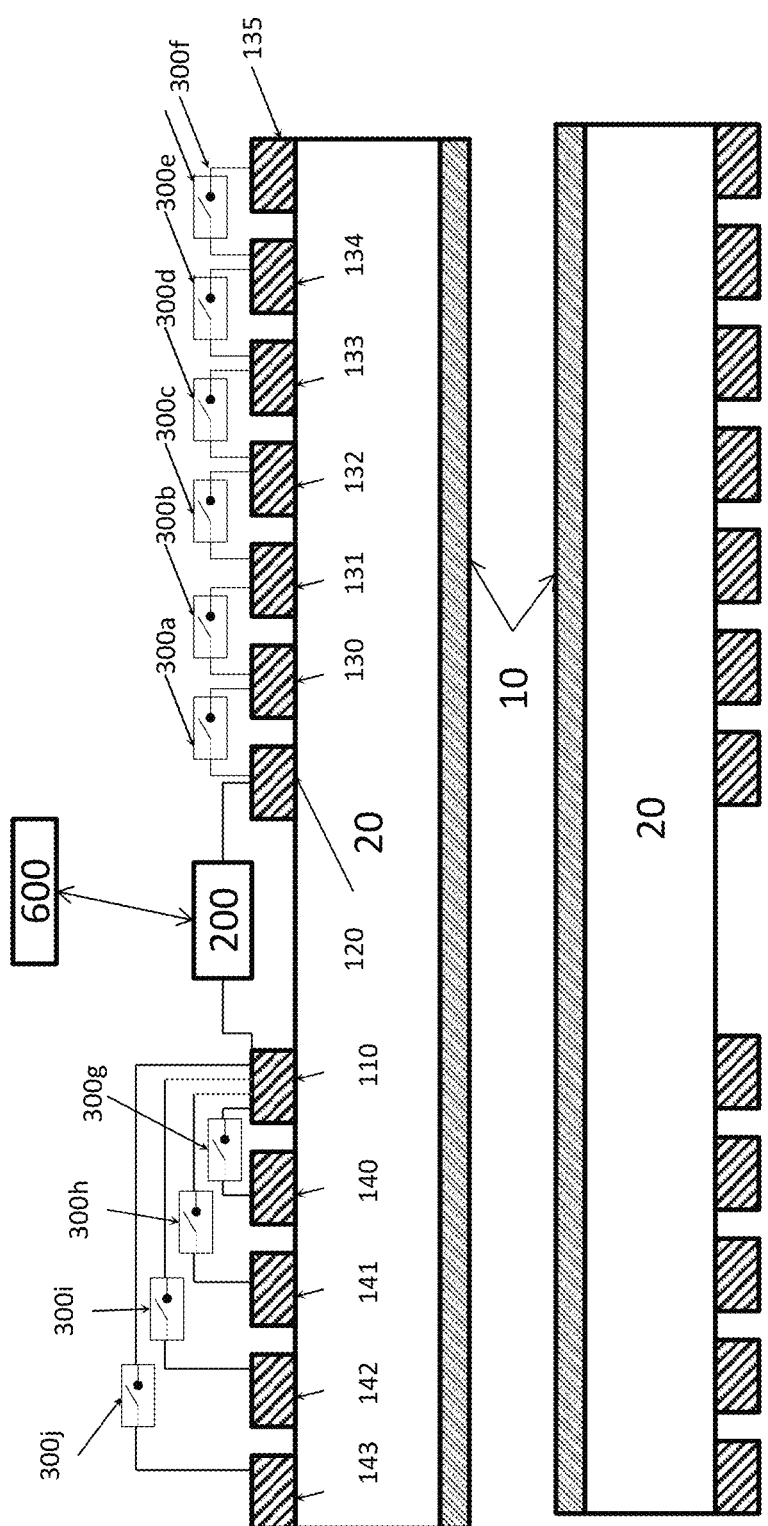
FIG. 3 is a schematic representation of a second exemplary embodiment of the system of FIG. 1 or 2, seen in longitudinal section along the longitudinal direction of a conduit.

According to a further embodiment, the control means 600 is configured to control the switching means 300 in a plurality of ways as will be elaborated in conjunction with FIG. 3.

Figure 2:
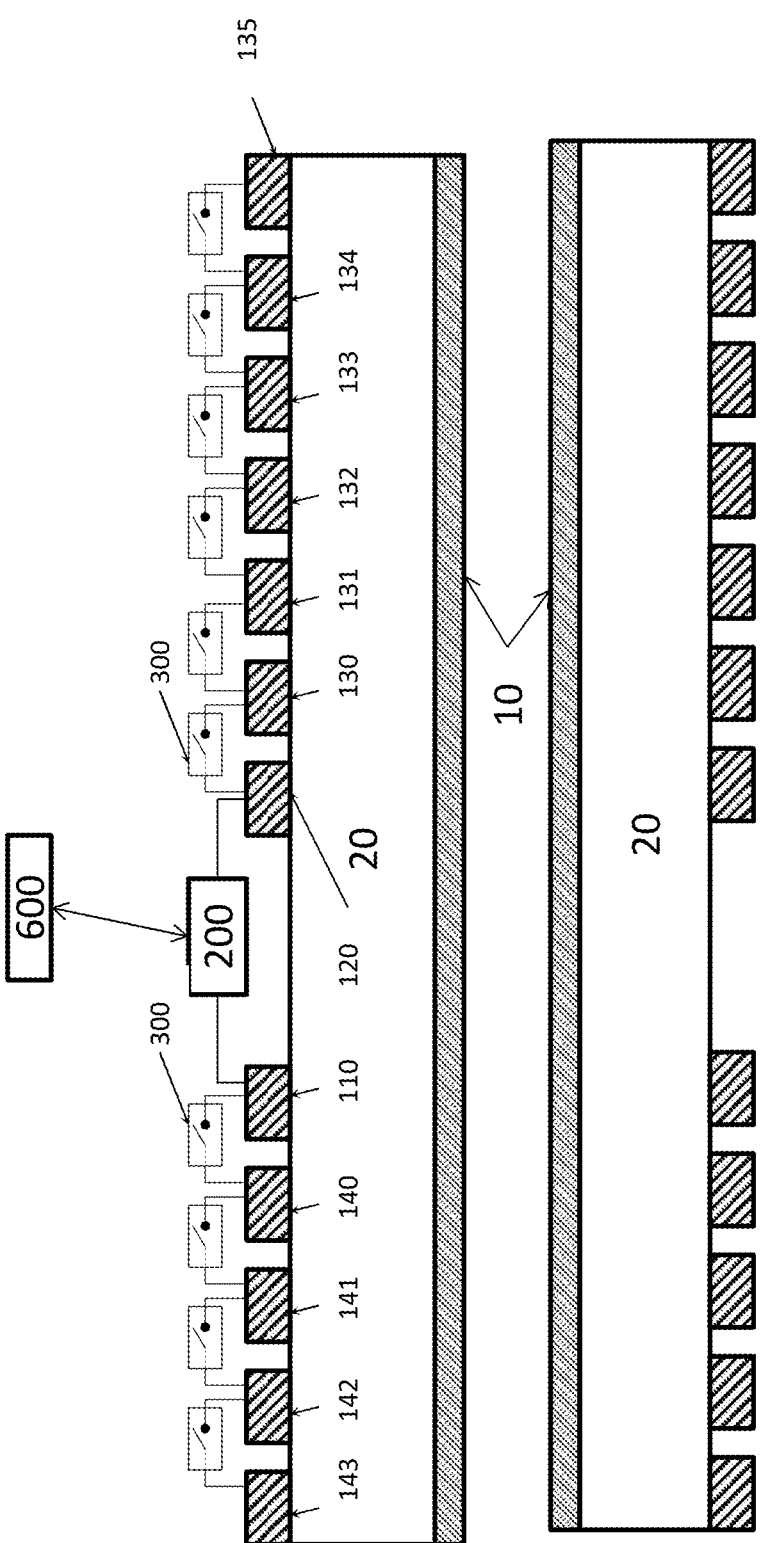
FIG. 2 is a schematic representation of a first exemplary embodiment of the system of FIG. 1, seen in longitudinal section along the longitudinal direction of a conduit.

FIG. 2 shows an exemplary further embodiment of the system as shown in FIG. 1. FIG. 2 shows in particular that the system may comprise one or more fourth conductors 140, 141, 142, 143 and at least a second switching means 300 configured for electrically connecting the first conductor 110 to a fourth conductor 140 of said one or more fourth conductors 140, 141, 142, 143 in a first state and for electrically disconnecting the first conductor 110 from the fourth conductor 140 of said one or more fourth conductors 140, 141, 142, 143 in a second state. Preferably, the first conductor 110 is arranged between the one or more fourth conductors 140, 141, 142, 143, and the second conductor 120. Also, each of the one or more fourth conductors 140, 141, 142, 143 may be interconnected by a further second switching means. In other words, the one or more third conductors may be extending in a longitudinal direction at a first side of the first and second conductors, and the one or more fourth conductors may be extending in a longitudinal direction on a second side of the first and second conductor. Such an arrangement allows to measure a greater portion of the conduit using the control and measuring circuit, in particular in two directions opposite to each other. Similarly as elaborated with regards to FIG. 1, by controlling the switching of the second switching means, the measuring area of the system may be controlled. In particular, the measuring area of the first pole and the second pole of the capacitor may be controlled, i.e. the first and fourth conductors and the second and third conductors, respectively, such that the system may accurately determine a location of a problem such as condensation and/or corrosion near any one of the first, second, third and fourth conductors.

FIG. 3 shows an alternative embodiment of an interconnection between the one or more third conductors 130, 131, 132, 133, 134, 135 and the one or more fourth conductors 140, 141, 142, 143. The skilled person will appreciate that the interconnections are illustrated as mere examples and may be arranged in any combination. Additionally, the control unit may control the first switching means 300*a-f* and the second switching means 300*g-j* in any order. According to the exemplary embodiment, the one or more third conductors 130, 131, 132, 133, 134, 135 are shown to be interconnected by respective first switching means 300 *a-f* in a serial way, meaning that each of the one or more third conductors is respectively electrically interconnected to an immediately adjacent third conductor. A serial interconnection of the one or more third conductors has the advantage that wiring used for the interconnection is limited. Such an advantage is further emphasized when, according to a preferred embodiment, the control unit is configured to wirelessly control at least the first switching means 300*a-f*. Such a preferred embodiment will be elaborated here below. The control unit 600 may control each of the first switching means 300*a-f*, respectively. By controlling each first switching means 300*a-f* the control unit controls the measuring range of the control and measuring circuit 200. For example, when all of the third conductors 130, 131, 132, 133, 134, 135 and the second conductor 120 are electrically connected by respective first switching means 300*a-f*, in other words when each of the first switching means 300*a-f* is in the first state, the control and measurement circuit 200 may monitor the largest portion of the conduit 10. When the control and measurement circuit 200 determines the presence of corrosion and/or condensation, the control unit 600 may, for example, switch the switching means 300*f*, which is situated furthest away from the control and measurement circuit, from the first state to the second state. The furthest third conductor 135 is, in doing so, electrically disconnected from the immediately adjacent third conductor 134, and the measuring range of the control and measurement circuit is reduced. Put differently, the measuring range of the control and measurement circuit is more narrow and thus determines a location of condensation and/or corrosion more accurately. According to the exemplary embodiment, the control unit 600 may further sequentially control each of the first switching means 300a-e, starting from the first switching means 300e arranged furthest away from the control and measurement circuit 200 to the switching means 300a arranged closest to the control and measurement circuit 200 until the control and measurement circuit 200 indicates a change in the value representative of the capacitive coupling between the respective electrically connected third conductors. The change in the value indicates that condensation and/or corrosion was detected at the location of the previously disconnected third conductor. The serial interconnection and the control unit sequentially controlling each of the switching means 300a-f has the advantage that, in a relatively simple way, the location of condensation and/or corrosion under insulation is accurately determined. The above method of determining the location of condensation and/or corrosion is indirect or, in other words, based on an interpretation of a change in the value representative for the capacitive coupling. In the above exemplary embodiment, the control unit sequentially controls each switching means 300a-f, it will however be immediately apparent that the control unit may control the switching means 300a-f according to a plurality of control methods. The control unit 600 may for example control the first switching means in a different order. Additionally, the control unit may, for example, control the switching means 300d from the first state to the second state, thus electrically disconnecting the third conductor portions 133, 134, 135 from the second conductor 120 and the third conductors 130, 131, 132. According to the exemplary embodiment, the measuring range of the control and measurement circuit 200 is effectively halved. When the control and measurement circuit 200 consequently determines a change in the value, the area in which the condensation and/or corrosion is situated may be narrowed down to the area covered by third conductors 133, 134, 135. In this way, the steps for determining the location of the corrosion and/or corrosion may be reduced.

FIG. 3 further illustrates that the first conductor 110 and the one or more fourth conductors 140, 141, 142, 143 are interconnected by respective second switching means 300g-j in a parallel way. Similarly to the above, the control unit may control the respective switching means 300g-j individually. Moreover, the control unit 600 may control the second switching means 300g-j in a similar way as elaborated above. The advantage of interconnecting the one or more fourth conductors in a parallel way is that the control and measurement circuit 200 may determine a location of condensation and/or corrosion based on the value measured between the respective electrically connected conductor portion. In other words, the control and measurement circuit 200 directly determines the location of condensation and/or corrosion.

Figure 4:
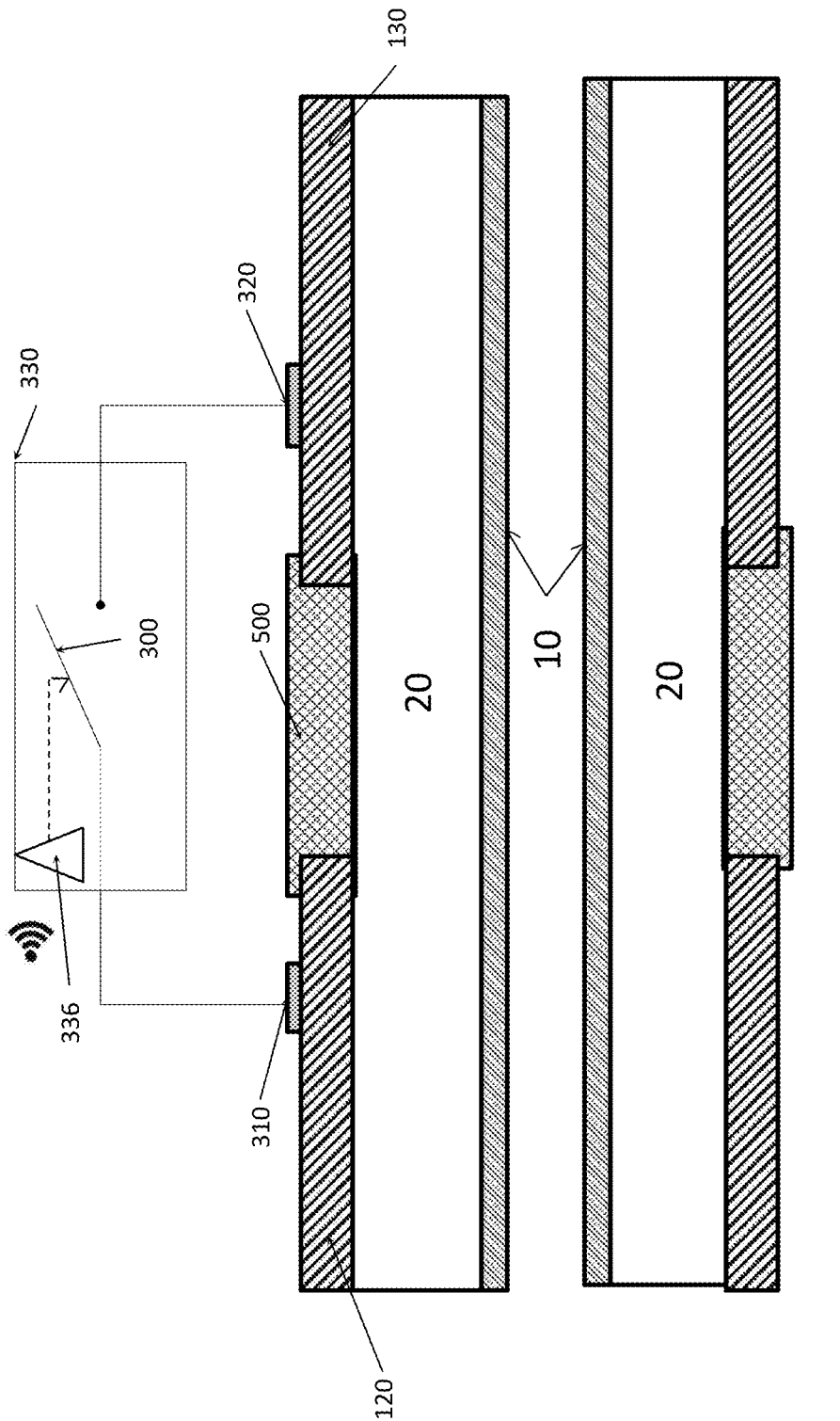
FIG. 4 is a schematic representation of a switching instrument according to an embodiment.

FIG. 4 illustrates a preferred embodiment of a switching instrument. The switching instrument comprises switching means 300. The switching means 300 is configured for electrically connecting the second conductor 120 to a third conductor 130 in a first state and for electrically disconnecting the second conductor 120 from the third conductor 130 in a second state. More generally, it will be immediately apparent that the switching means 300 may electrically interconnect two conductors. The switching means 300 may, for example, electrically interconnect two third conductors as illustrated in any one of the FIGS. 1, 2, 3. According to a further exemplary embodiment, the switching means may electrically connect the first conductor and a fourth conductor or two fourth conductors, as illustrated in FIG. 3.

The switching instrument may comprise a switching means housing 330. The switching means 300 may be accommodated in said switching means housing 330. The switching instrument may further comprise a first fixation means 310 attached to the switching means housing 330 and a second fixation means 320 attached to the switching means housing 330. The first fixation means 310 and the second fixation means 320 are configured to be arranged on the second conductor 120 and a third conductor 130, respectively. Further, it will be immediately apparent that the first fixation means 310 and the second fixation means 320 may be configured to be arranged on the first conductor and a fourth conductor, respectively. Further even, it will be clear that the first fixation means 310 and the second fixation means 320 may be configured to be arranged on any one of the one or more third conductors and an adjacent third conductor of the one or more third conductors and/or on a fourth conductor and an adjacent fourth conductor of the one or more fourth conductors, respectively. The switching means 300 is electrically connected at its respective terminals to the first fixation means 310 and the second fixation means 320. This allows to electrically connect the switching means 300 to the corresponding conductors 120, 130.

The switching means housing 330 may be at least partially formed from a corrosion-resistant material such as stainless steel or plastic. It is noted that when the switching means housing 330 is applied in explosive environments, said housing is preferably conductive, even a switching means housing 330 formed from a plastic is in such an instance preferably at least partly conductive, for example by forming the switching means housing from an electrically conductive plastic. This avoids the built up of static electricity which may result in an electrical discharge and thus avoids a risk for explosions.

FIG. 4 further illustrates that the second conductor 120 and the third conductor 130 are preferably arranged at a distance of each other, seen in a longitudinal direction of the conduit, wherein at a transition area between two immediately adjacent conductor portions a moisture-resistant and electrically insulating strip 500, preferably butyl tape or rubber, is arranged. Alternatively, the immediately adjacent conductors overlap only partially (not shown) at an outer end thereof, wherein at an overlapping area in between two immediately adjacent conductors, the resistant and electrically insulating strip is arranged, preferably butyl tape or rubber. Optionally, the moisture-resistant and electrically insulating strip 500 may retroactively be fitted. This allows installing the system on existing conduits provided with insulation and electrically conductive cladding.

Figure 5:
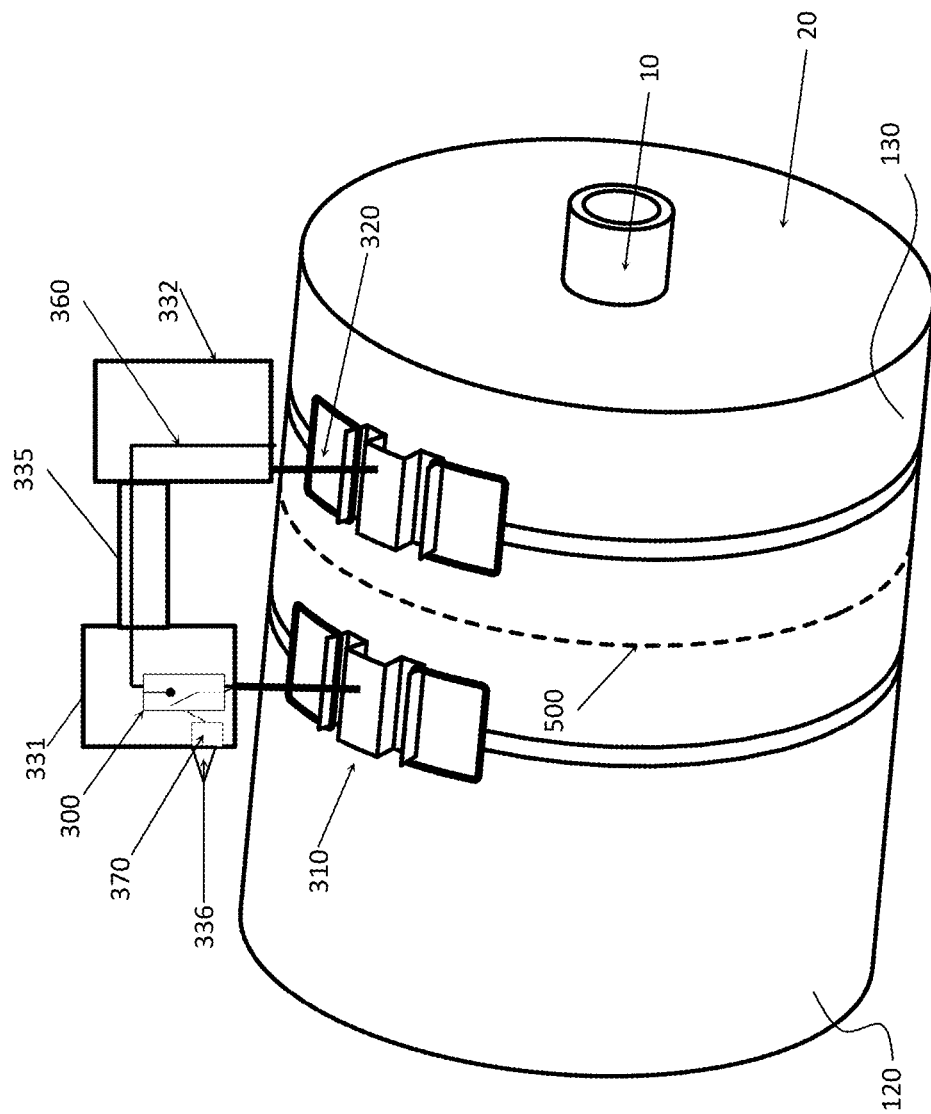
FIG. 5 is a perspective schematic representation of a further embodiment of the switching means of FIG. 4 arranged on two conductors.

FIG. 5 schematically illustrates a further preferred embodiment of the switching instrument. FIG. 5 illustrates that the switching means housing comprises a first housing portion 331 and a second housing portion 332. The first housing portion 331 and the second housing portion 332 are connected to each other. Each of the first housing portion 331 or the second housing portion may be configured to accommodate the switching means 300. The first housing portion 331 and the second housing portion 332 may be interchangeably used. Because the first and second housing portions 331, 332 are interchangeable, only one design of the housing portions is required which simplifies the mounting of the switching instrument while simultaneously reducing production costs.

The first housing portion 331 and the second housing portion 332 are attached to the first fixation means 310 and the second fixation means 320, respectively. The first fixation means 310 and the second fixation means 320 are shown to be clamped on the second conductor 120 and the third conductor 130. This allows to electrically connect the switching means 300 to the corresponding conductors in a simple and non-intrusive way.

Figure 10:
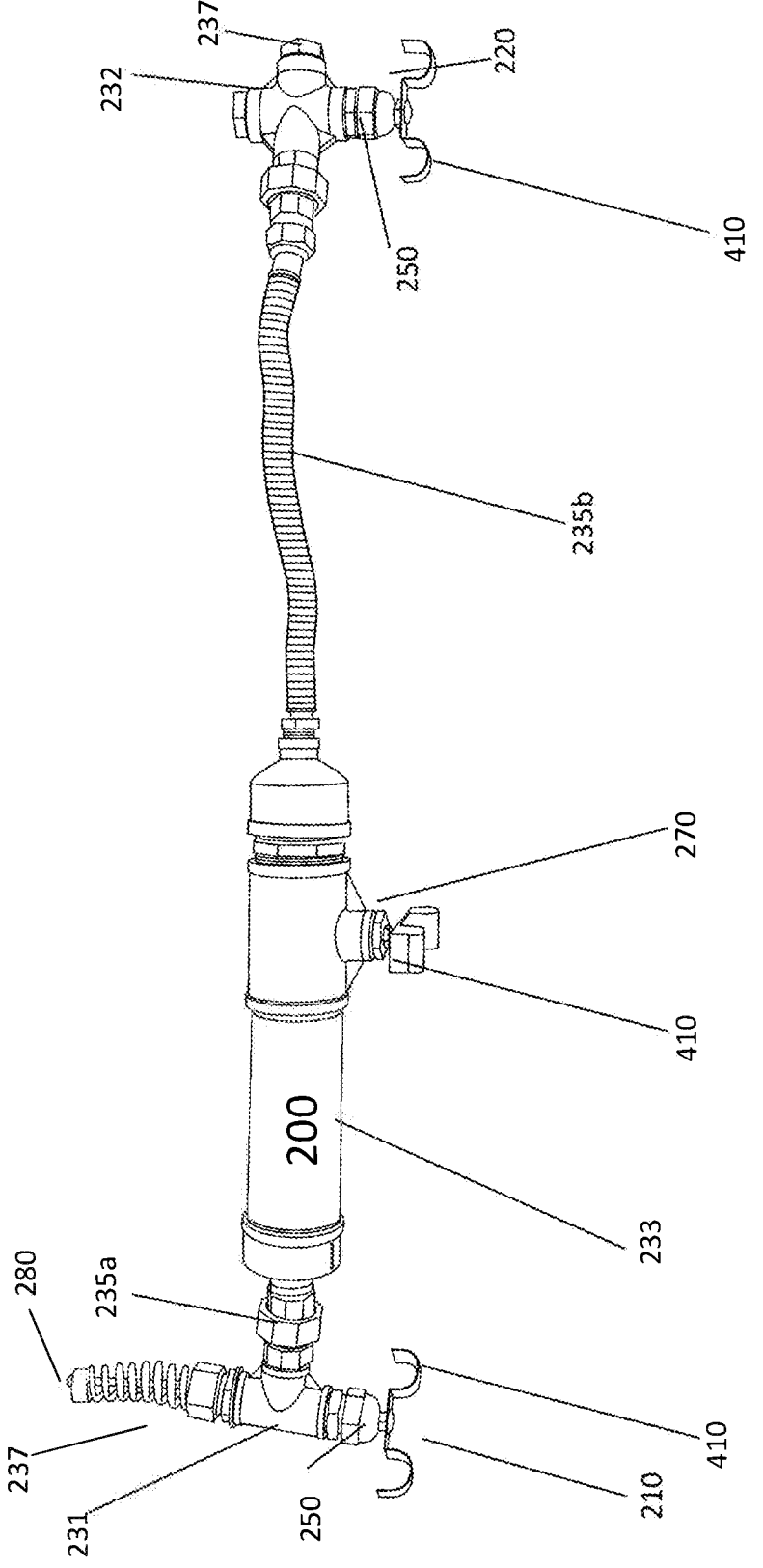
FIG. 10 is a preferred embodiment of the measurement instrument as illustrated in FIGS. 8, 9A and 9B.

The switching means housing may further comprise a bridging portion 335 for connecting the first housing portion 331 to the second housing portion 332. The bridging portion is preferably a deformable duct, such as a ribbed duct. This allows to easily bridge the transition area between the two immediately adjacent conductors 120, 130. The bridging portion may also be a bolt coupling, as illustrated in FIG. 10. This may be an advantage when two immediately adjacent conductors have a very narrow transition area 500.

The bridging portion 335 may be configured to accommodate an electrical cable 360 extending from the second conductor 120, via the switching means 300, to the third conductor 130. In this way, the switching means 300, and the electrical cable 360 are protected from the environment. This improves the longevity of the switching instrument and the accommodated switching means. Moreover, this also reduces the probability of unintentionally short-circuiting the corresponding conductors due to, for example, water ingress.

The switching instrument may further comprise a wireless receiving means 370 configured for wirelessly receiving a control signal from the control means and for controlling the switching means 300 in accordance with the control signal. The switching means housing may comprise a non-metallic part 336. In such an embodiment the wireless receiving means 370 is arranged close to the non-metallic part of the switching means housing. The advantage thereof is based on the insight that, when the switching means housing is fabricated from a metal, said metal housing obstructs the control signal. By providing the switching means housing with the non-metallic part 336 and arranging the wireless receiving means 370 close to said non-metallic part, the receipt of the control signal is improved.

Further, each of the first fixation means 310 and the second fixation means 320 are shown to comprise a first and a second clamping part from an electrically conductive material, respectively. Said first and second clamping parts will be described in relation to FIG. 7.

Figure 6:
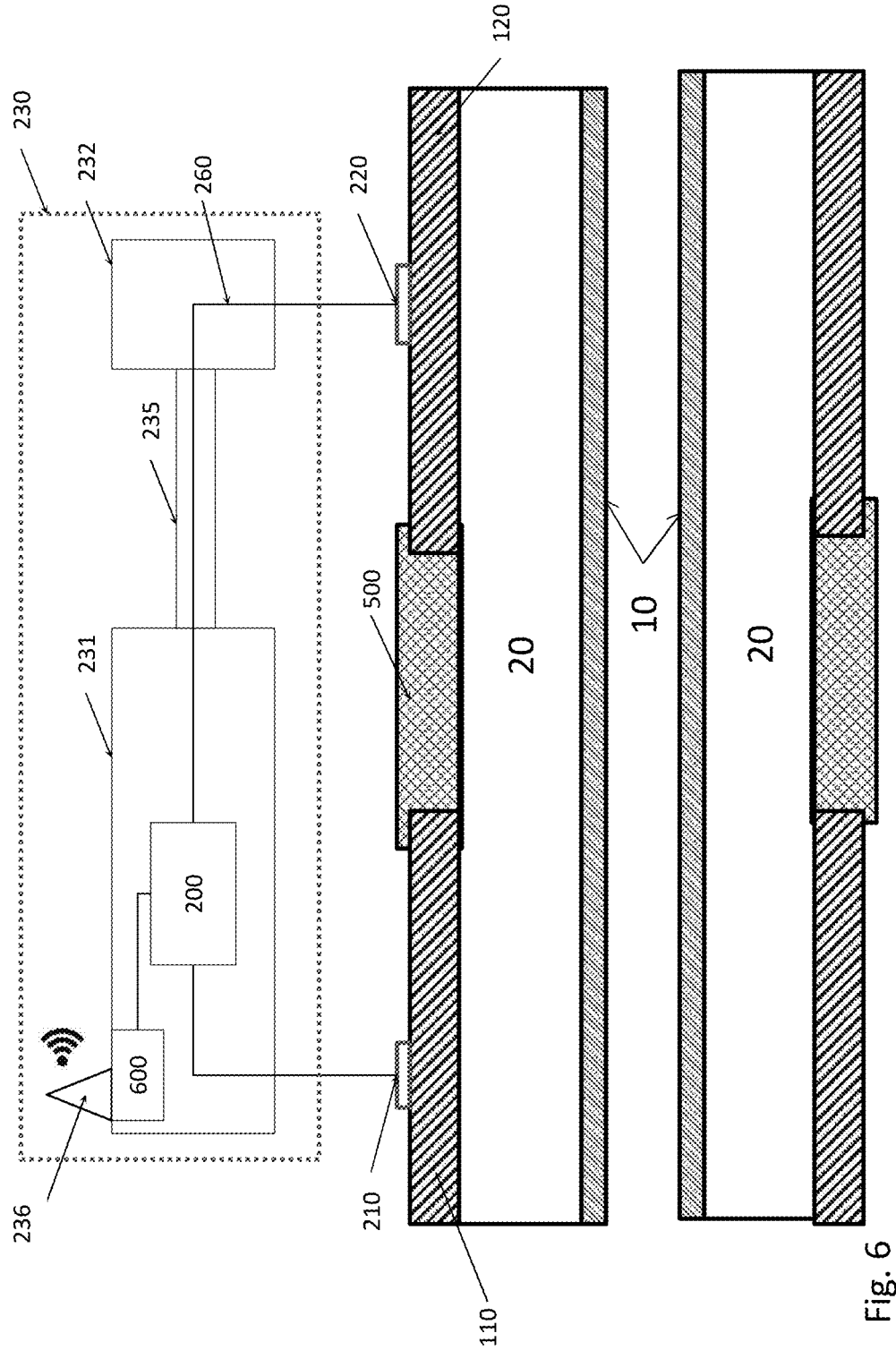
FIG. 6 is a schematic representation of a control and measurement circuit accommodated in a control and measuring circuit housing arranged on two conductors.

FIG. 6 illustrates a schematic preferred embodiment of the control and measuring circuit 200. The control and measuring circuit 200 is accommodated in a control and measuring circuit housing 230. The control and measuring circuit housing 230 comprises a first fixation means 210 and a second fixation means 220. The first fixation means 210 and the second fixation means 220 are attached to the control and measuring circuit housing 230. The first fixation means 210 and the second fixation means 220 are shown to be arranged on the first conductor 110 and the second conductor 120, respectively. Similarly, each of the first fixation means 210 and the second fixation means 220 may comprise a first and a second clamping part from an electrically conductive material, respectively, as will be described hereinbelow.

The control and measuring circuit housing 230 preferably comprises a first housing portion 231 and a second housing portion 232. The control and measuring circuit 200 may be arranged in any one of the first housing portion 231 and the second housing portion 232. Moreover, a housing portion of the measuring circuit housing 230 which accommodates the control and measuring circuit 200 may also be nominated as the control and measuring circuit housing portion, as will be described in FIG. 10. The first housing portion 231 and the second housing portion 232 are connectable to each other. The control and measuring circuit housing 230 preferably comprises a bridging portion 235 configured for connecting the first housing portion 231 to the second housing portion 232. The bridging portion is preferably a deformable duct, such as a ribbed duct. This allows to easily bridge the transition area between the two immediately adjacent conductors 110, 120. The bridging portion may also be a screw coupling, as illustrated in FIG. 10. This may be an advantage when two immediately adjacent conductors have a very narrow transition area 500.

The control and measuring circuit 200 is electrically connected to the first fixation means 210 and the second fixation means 220, respectively. An electrical cable 260 may be provided to electrically interconnect the first fixation means 210 via the control and measuring circuit 200 to the second fixation means 220. The bridging portion 235 accommodates the electrical cable 260.

FIG. 6 further illustrates that the control means 600 is accommodated in the control and measuring circuit housing 230. The control means 600 may comprise an antenna 236 for wireless communication with the wireless receiving means. It is further preferred that each switching means is wirelessly controlled by the control unit. If wireless communication is used, this can for instance be done by means of communication technology with low power and far reach (Low-Power Wide-Area Network). Examples hereof are LoRa/LoRaWAN, SigFox, Bluetooth (LE). Alternatively, use can also be made of communication technology with a relatively higher power, such as wireless local network technology (Wireless Local Area Network, WLAN, such as Wi-Fi, i.e. IEEE 802.11) or mobile cellular network technology (such as GSM and related standards and protocols). Other wireless protocols such as WirelessHART protocol may also be used.

Figure 7:
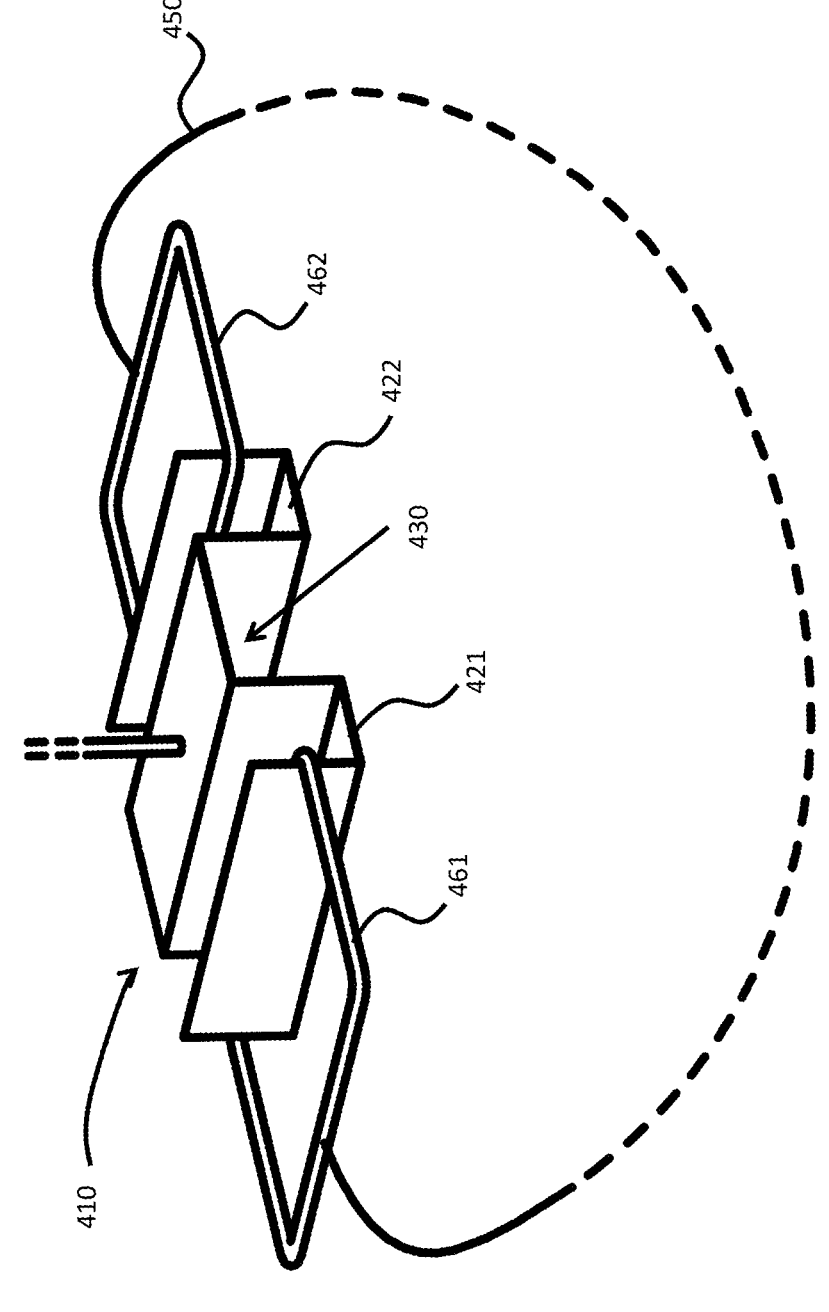
FIG. 7 is a perspective view of a clamping part according to an embodiment.

FIG. 7 illustrates a perspective view of a clamping part 410. According to a preferred embodiment, each of the fixation means 210, 220, 310, 320 comprise a respective clamping part 410. The clamping part 410 is made from an electrically conductive material. The first and second fixation means are configured to clamp said clamping part 410 against a corresponding conductor. Because the clamping part is made from an electrically conductive material and the fixation means are electrically connected to the control and measuring instrument or the switching means, an electrical interconnection between two conductors is possible in a simple manner. This further simplifies the installation of the system since intrusive operations wherein holes are drilled in the conductor or insulator are avoided.

The clamping part 410 is substantially omega-shaped having two clamping flanges 421, 422 configured for interlockingly engaging a strap 450. The two clamping flanges 421, 422 are connected to each other via a mounting segment 430. Each of the clamping flanges 421, 422 comprises a mounting surface which, when the clamping part is arranged on a conductor, forms at least a point of contact with the conductor. Further, the two clamping flanges 421, 422 are arranged on opposite sides of the mounting segment 430, preferably at a distance from each other. This allows arranging the clamping part such that the strap 450 interlockingly engages each of the clamping flanges from opposite sides of the clamping part 410. The clamping part 410 provides an optimal support structure for fixation means in this way. Additionally, by arranging the clamping flanges at a distance of each other tilt of the fixation means is substantially limited and thus a mounting stability of the fixation means is improved.

The strap 450 may be provided with two buckles 461, 462 which respectively interlock with the two clamping flanges 421, 422. According to the illustrated embodiment, the buckle 461 interlockingly engages clamping flange 421. The strap 450 extends from the buckle 461 to the buckle 462 and surrounds a circumference of the insulator. The skilled person will appreciate that other means for fixing the fixation means may be provided, for example, electrically conductive glue may be used to fix the fixation means in a toolless way or the fixation means may be soldered or welded on to the conductors. Welding the fixation means sturdily fixes the fixation means to the conductor and provides an excellent electrical interconnection. Welding is however an intensive and time consuming operation.

Figure 8:
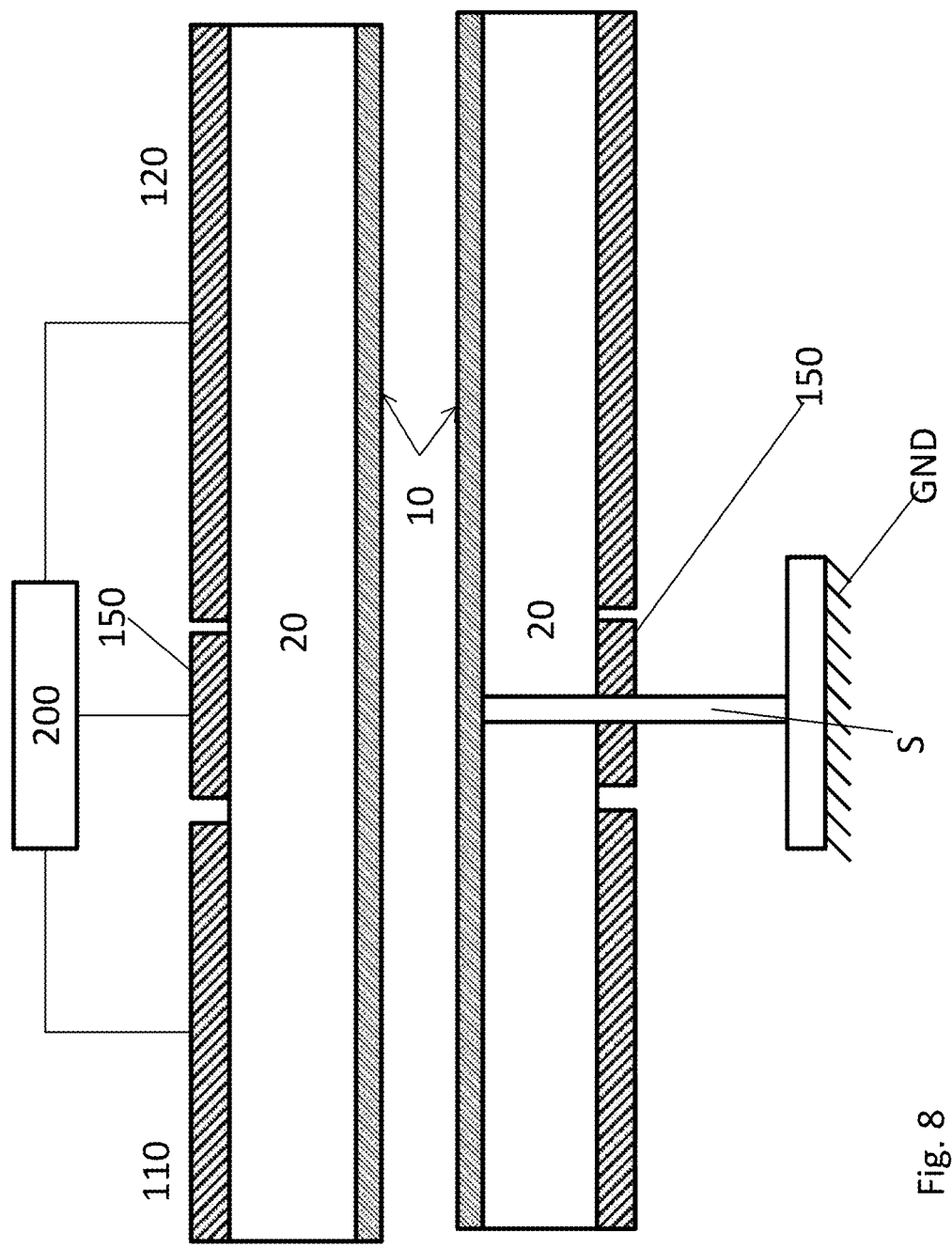
FIG. 8 is a schematic representation of a measurement instrument according to an embodiment.

FIG. 8 illustrates schematically an embodiment of a control and measuring circuit 200 seen in a longitudinal section along the longitudinal direction of a conduit 10. The control and measuring circuit 200 is configured for measuring the conduit 10 surrounded by an insulator 20 provided with a first conductor 110, a second conductor 120, and an additional conductor 150 arranged between the first conductor 110 and the second conductor 120. The additional conductor 150 is intended to be grounded. In practical applications, the conduit 10 is typically supported at regular intervals by a conduit support S. The conduit support S is grounded and because the additional conductor 150, surrounds the insulator 20 and is in contact with the conduit support S, said additional conductor 150 is electrically connected to the grounded conduit support S. In other words, the additional conductor 150 is grounded. In the first state, a measurement area of the measurement instrument is situated between conduit 10 and the second conductor 120. By extension, the measurement area is situated between the additional conductor 150 and the second conductor 120 because the additional conductor 150 is electrically connected to the conduit 10 via the conduit support S. In the second state the measurement area of the measurement instrument is situated mainly between the first conductor 110 and the second conductor 120. If a measurement in the second state indicates a problem, it can be derived that the problem will be situated close to the first, second, and additional conductor. If in the first state the measurement does not indicate a problem, it can be derived that the problem is situated near the first conductor. If, in the first state, the measurement indicates a problem but the measurement does not indicate problem in the second state, it can be derived that the problem is situated near the additional conductor and the second conductor. The measurement instrument thus allows to accurately determine the location of a problem, such as corrosion and/or condensation, near conduit supports.

Figure 9A:
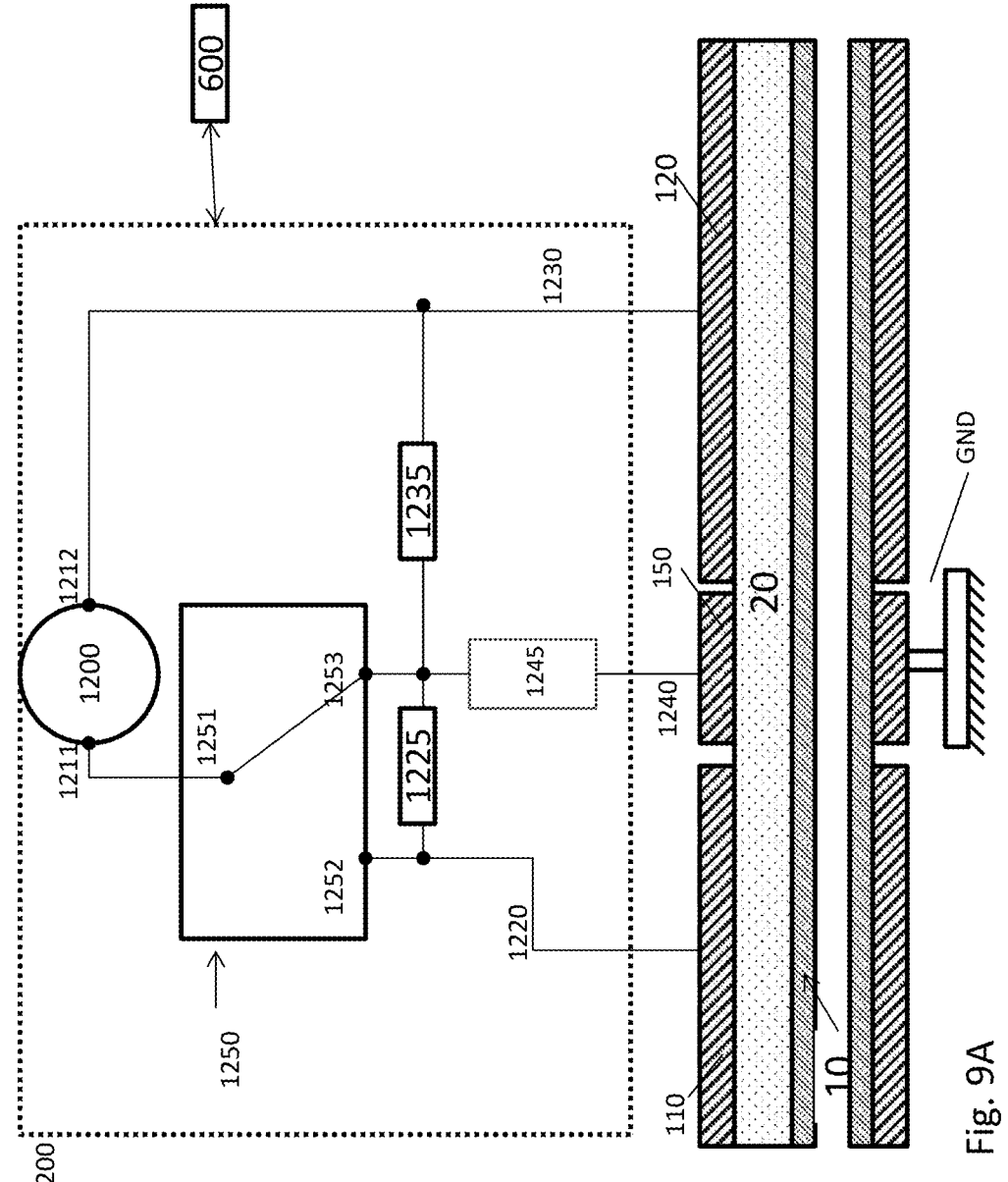
FIG. 9A is a schematic representation of a control and measuring circuit of the measurement instrument according to an embodiment.

FIG. 9A is a schematic representation of a preferred embodiment of a control and measuring circuit 200. It is noted that only part of the conduit 10 is illustrated. The measuring circuit comprises a measuring means 1200 having a first pole 1211 and a second pole 1212. The control and measuring circuit 200 further comprises a first branch 1220, a second branch 1230, and an additional branch 1240 respectively connectable to the first conductor 110, the second conductor 120, and the additional conductor 150, wherein the second branch 1230 is operably connected to the second pole 1212.

Additionally, a switching circuit 1250 is provided. The switching circuit 1250 has a first terminal 1251 connected to the first pole and a second terminal 1252, 1253 configured to switch between the first branch 1220 and the additional branch 1240. The switching circuit is configured to, in a first switching state, operably connect the first pole to the first branch 1220. In this way, the measuring circuit determines a value between the first conductor 110 and the second conductor 120. In a second switching state, the switching circuit 1250 operably connects the first pole to the additional branch 1240. In this way, the measuring circuit determines a value for the capacitive coupling between the second conductor 120 and conduit 10. The switching circuit 1250 may for example be a single-pole changeover, SPCO.

According to the illustrated preferred embodiment, the additional branch 1240 comprises a resistive component 1245 arranged between the third conductor 150 and the second terminal 1253. Additionally, a further resistive component 1225 and 1235 may be arranged between the first branch 1220 and the additional branch 1240 and the second branch 1230 and the additional branch 1245, respectively. This allows to electrically connect each of the first, second, and additional conductor such that said first, second, and additional conductor form an equipotential node. Tests have shown that for optimal results the resistive component has a value larger than 100 kΩ, preferably larger than 300 kΩ and preferably smaller than 1000 kΩ. Tests have shown that resistive components having such a value do not substantially influence the capacitive measurements. Additional, because the value is preferably smaller than 1000 kΩ, electrical discharges are substantially avoided. In this way, the measuring circuit 200 can be applied in intrinsically safe conditions.

FIG. 9A illustrates that the control and measuring circuit 200 determines in a first state, a first value which is representative of the capacitive coupling between the second conductor 120 and the conduit 10 and to determine, in a second state, a second value which is representative of the capacitive coupling between the first conductor 110 and the second conductor 120. However, it will be appreciated by the skilled person that by mirroring the illustrated control and measuring circuit and applying a further switching circuit, see FIG. 9B, the control and measuring circuit may, in a third state, determine a third value which is representative of the capacitive coupling between the first conductor 110 and the conduit 10. In this way, the accuracy of determining the location of condensation and/or corrosion near the conduit support is further improved.

Figure 9B:
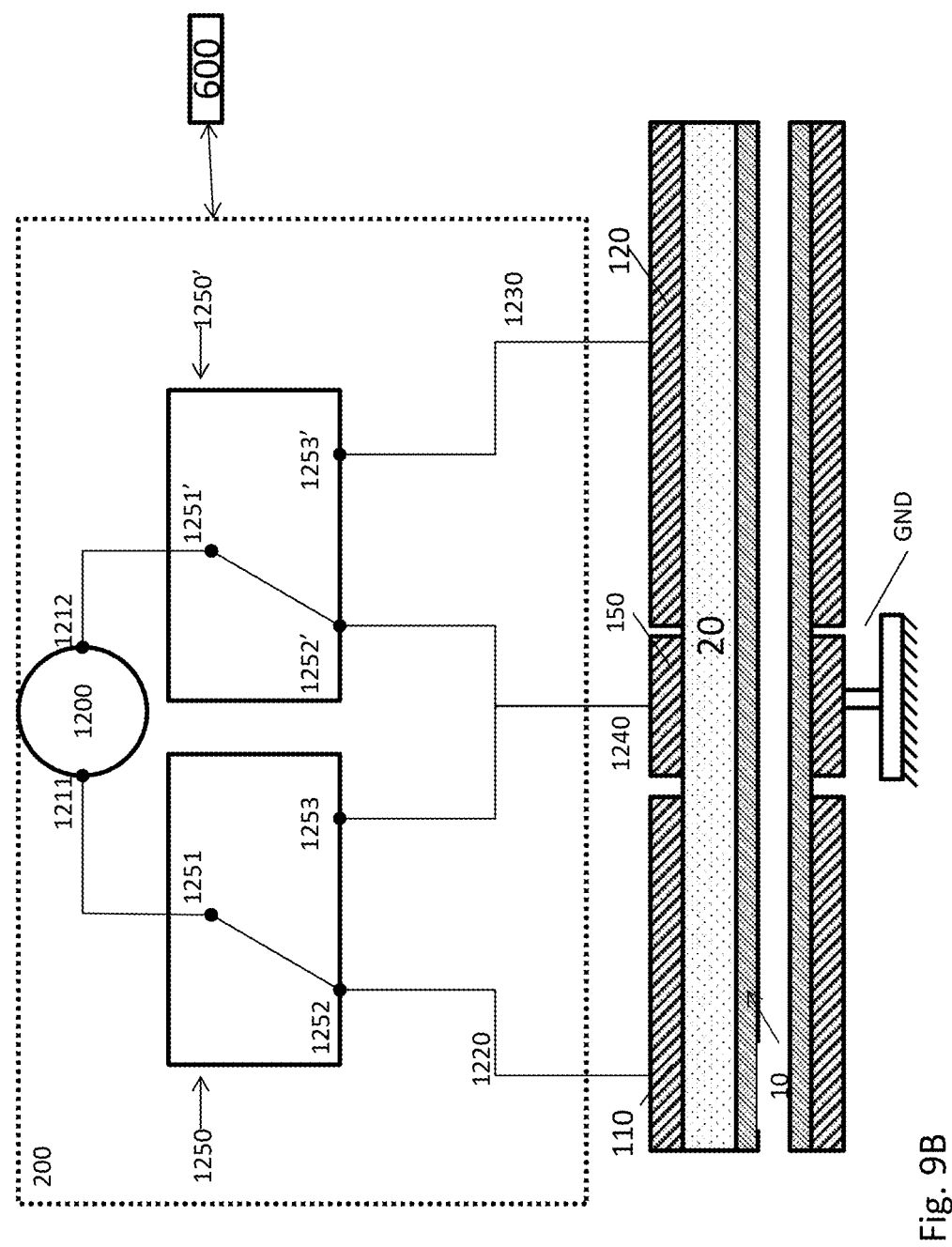
FIG. 9B is a schematic representation of the control and measuring circuit of FIG. 9A according to a further embodiment.

FIG. 9B illustrates a further embodiment of the control and measuring circuit 200 illustrated in FIG. 9A. The control and measuring circuit 200 is further configured to determine, in a third state, a third value which is representative of the capacitive coupling between the first conductor 110 and the conduit 10. More in particular, a further switching circuit 1250' may be provided. The further switching circuit 1250' has a first terminal 12521' connected to the second pole 1212 and a second terminal 1253', 1252' configured to switch between the second branch 1230 and the additional branch 1240, respectively. The further switching circuit 1250' is configured to, in a first switching state, operably connect the second pole 1212 to the second branch 1230. In a second switching state, the further switching circuit 1250' operably connects the second pole 1212 to the additional branch 1240. In this way, the measuring circuit 200 can determine a value for the capacitive coupling between the first conductor 110 and conduit 10. In particular by connecting the switching the first pole 1211 to the first conductor using the switching circuit 1250 and by connecting the second pole 1212 to the additional conductor 150 using the further switching circuit 1250'. In this way, a measurement area of the measurement instrument 200 is situated between the first conductor 110 and the conduit 10. This is the third state of the measurement instrument 200. Similarly to the above, if a measurement in the second state indicates a problem, it can be derived that the problem will be situated close to the first, second, and additional conductor. When the measurement instrument 200 performs a measurement in the third state, after a measurement in the second state, and said measurement in the third state does not indicate a problem, it can be derived that the problem is situated near the second conductor. Moreover, if a measurement in each of the first, second and third state indicates a problem, it can be derived that the problem is situated near the additional conductor 150. Additionally, it will be clear to those skilled in the art that, if a measurement in each of the first, second and third state indicates a problem, the problem may be situated near the first, second and additional conductor 110, 120, 150 simultaneously. In this way, the determination of the location of a problem such as corrosion and/or condensation, near conduit supports is further improved. Similarly as shown in FIG. 9A, further resistive components (not shown in FIG. 9B) may be arranged between the first branch 1220 and the additional branch 1240 and the second branch 1230 and the additional branch 1245, respectively. This allows to electrically connect each of the first, second, and additional conductor such that said first, second, and additional conductor form an equipotential node FIG. 10 shows a measuring instrument according to a preferred embodiment. The measurement instrument comprises the control and measuring circuit 200 as illustrated in FIG. 9. The measuring instrument comprises, according to the preferred illustrated embodiment a first housing portion 231, a second housing portion 232, and a control and measuring circuit housing portion 233. The control and measuring circuit housing portion 233 is configured for accommodating the control and measuring circuit 200. The first housing portion 231, the second housing portion 232, and the control and measuring circuit housing portion 233 are connected to each other. The measurement instrument further comprises a bridging portion 235b connecting the second housing portion 232 to the control and measuring instrument portion 233. Said bridging portion 235b is preferably a deformable duct. The measurement instrument comprises a further bridging portion 235a connecting the first housing portion 231 to the control and measuring housing portion 233. The further bridging portion 235a may be a screwable coupling. It will be apparent that the bridging portions may be interchanged depending on the location where the measurement instrument is intended to be placed.

Further, a first fixation means 210, a second fixation means 220 and an additional fixation means 270 are attached to the first housing portion 231, the second housing portion 232, and the control and measuring circuit housing portion 233, respectively. The first, second and additional fixation means 210, 220, 270 each comprise a clamping part 410 such that said first, second and additional fixation means are configured to clamp said first, second, and additional clamping part against the first, the second, and the additional conductor, respectively. In this way, each of the housing portions may be easily installed on the corresponding conductors.

According to a preferred embodiment, the control and measuring circuit housing 233 is elongated. An elongated control and measuring circuit housing 233 is advantageous since such a shape allows to arrange said control and measuring circuit housing 233 near a transition area between the additional conductor and the first conductor. The elongated control and measuring circuit housing 233 extends in this way from the additional conductor, over the transition area, to the first conductor. The elongated control and measuring circuit housing 233 may be attached, at one end thereof, to the first housing portion 231 arranged on the first conductor. Connecting the elongated control and measuring circuit housing 233 via the bridging portion 235 to the first housing portion 231 forms a robust installation. In order to bridge the distance from the other end of the control and measuring circuit housing to the second conductor the bridging portion, being a flexible and stretchable duct may be arranged to connect said second end of the control and measuring circuit housing to the second housing portion 232. Because the bridging portion 235 is deformable the bridging portion 235 can be customly installed on-site independent of site conditions.

FIG. 10 further shows that the first housing portion 231 is provided with a wireless transmission portion 237. Said transmission portion is made from a non-metallic material. The skilled person understands that the transmission portion 237 may be provided to any one of the first housing portion, the second housing portion 232, and the control and measuring circuit housing 233. Further, each of the first housing portion 231, the second housing portion 232, and the control and measuring circuit housing 233 may be provided with such a wireless transmission portion 237.according to the illustrated embodiment only the first and second housing portion 231, 232 are provided with a wireless transmission portion 237. Preferably, the measurement instrument comprises a control means which is accommodated in the control and measuring circuit housing 233 and comprises an antenna 280 for wireless communication with the wireless receiving means (not shown). As shown in FIG. 10 the antenna 280 is arranged close to the wireless transmission portion 237. An advantage of such a wireless transmission portion is based on the insight that, when the control and measuring circuit housing and the switching means housing portions are fabricated in a corrosion-resistant material such as stainless steel, galvanized steel, aluminium, a wireless transmission signal, in particular in low power and far reach communication technology is not capable of penetrating such materials. The provision of a wireless transmission portion improves the transmission and reception of wireless signals and thus improves the wireless communication between, for example, the control unit and the switching means.

Figure 11:
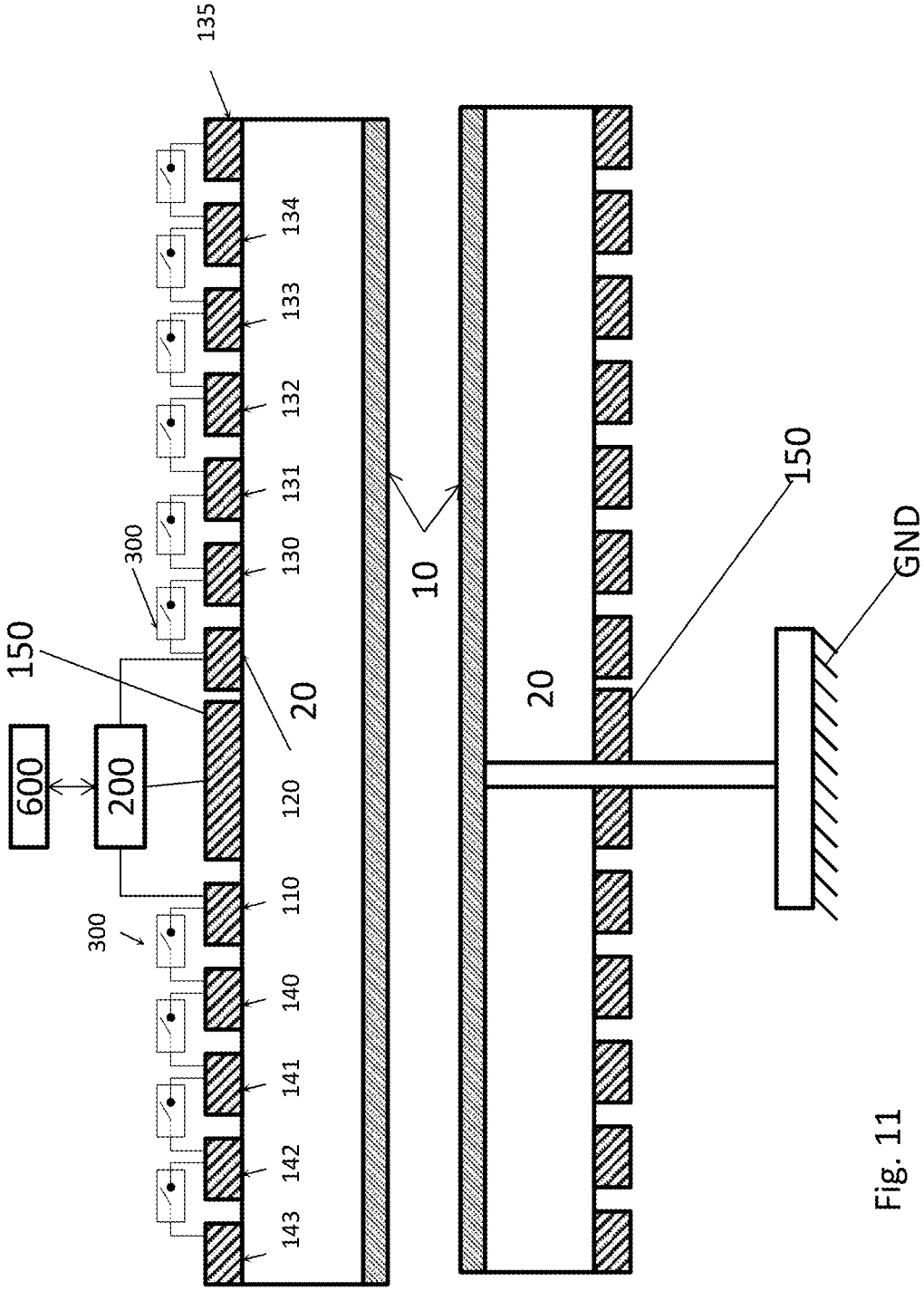
FIG. 11 is a schematic representation of a measurement instrument illustrated in any one of the FIGS. 8, 9A, 9B, 10 in the system as illustrated in any one of the FIGS. 1-3.

FIG. 11 is a schematic representation of a preferred embodiment of using the control and measuring circuit 200 as described in FIGS. 7-8 in the system as described in any one of the previous FIGS. 1-6. The advantage of such an embodiment is that the measurement instrument 200 may be arranged on the additional conductor 150 in order to determine corrosion under the additional conductor 150, in addition to improving the accuracy of the determination of the location of condensation and/or corrosion on either side of the additional conductor. The advantages disclosed hereabove with respect to improved accuracy and a controllable measuring area thus apply, mutatis mutandis, to FIG. 9.

According to a preferred embodiment the first conductor, the second, the one or more third conductors, or the one or more fourth conductors are each embodied as an electrically conductive coating or cladding for the insulator. This allows to optimally protect the insulator. Moreover, this allows to retroactively fit the system when existing conduits comprising an insulator are provided with such electrically conductive coating or cladding. In order to retroactively fit the system, where necessary, each of the cladding must be electrically insulated from each other by inserting a moisture-resistant and electrically insulating strip in between adjacent cladding. Further, a switching means can be arranged between the claddings such that the measuring range may be controlled. An advantage of arranging such an insulating strip is that it further limits water ingress and hence improves the longevity of the conduit. Alternatively, the first conductor, the second, and the one or more third conductors are each shaped as at least a portion of an electrically conductive sleeve configured to cover at least a portion of the insulator.

Based on the above, it will be clear that the accuracy of determining a location of condensation, moisture, leakage and/or corrosion may be configured by choosing a respective size of each conductor. In the case of electrically conductive cladding, which typically has a size, seen in a longitudinal direction, of 1 meter, and is individually isolated with regards to immediately adjacent claddings, the system can determine a location of corrosion and/or condensation within said 1 meter range. The accuracy of such a system may be further configured by electrically connecting a desired number of claddings and electrically isolating said number of claddings from further adjacent claddings. A switching means may further be arranged in order to interconnect said respectively electrically isolated adjacent claddings where a measurement is required. In other words, the surface covered by electrically connected claddings (without a switching means) determines the accuracy of the system.

The skilled person will understand that many modifications and variants can be envisaged within the scope of the invention, which is defined solely by the following claims.

The invention claimed is:

1. A system for measuring a conduit surrounded by an insulator provided with a first conductor, a second conductor and one or more third conductors, comprising:

a control and measuring circuit configured to determine a value which is representative of the capacitive coupling between the first conductor and the second conductor and one or more of said third conductors;

at least a first switching means configured for electrically connecting the second conductor to a third conductor of said one or more third conductors in a first state and for electrically disconnecting the second conductor from the third conductor of said one or more of third conductors in a second state; and a control means configured for controlling the control and measuring circuit and the first switching means such that the measurements are performed in the first and second state of the first switching means.

2. The system according to claim 1, wherein the second conductor is arranged between the one or more third conductors and the first conductor.

3. The system according to claim 1, further comprising one or more fourth conductors and a second switching means configured for electrically connecting the first conductor to a fourth conductor of said one or more fourth conductors in a first state and for electrically disconnecting the first conductor from the fourth conductor of said one or more fourth conductors in a second state.

4. The system according to claim 3, wherein the first conductor is arranged between the one or more fourth conductors and the second conductor.

5. The system according to claim 1, further comprising a switching means housing accommodating the first switching means, a first fixation means attached to the switching means housing and a second fixation means attached to the switching means housing, wherein the first fixation means and the second fixation means are configured to be arranged on the second conductor and the third conductor of said one or more third conductors, respectively.

6. The system according to claim 5, wherein the first switching means housing comprises a first housing portion and a second housing portion being connected to each other, wherein the first fixation means and the second fixation means are attached to the first housing portion and the second housing portion, respectively.

7. The system according to claim 6, wherein the switching means housing further comprises a bridging portion connecting the first housing portion and the second housing portion.

8. The system according to claim 7, further comprising a wireless receiving means configured for wirelessly receiving a control signal from the control means and for controlling the first switching means in accordance with the control signal.

9. The system according to claim 1, further comprising a control and measuring circuit housing configured for accommodating the control and measuring circuit, a first fixation means attached to the control and measuring circuit housing and a second fixation means attached to the control and measuring circuit housing, wherein the first fixation means and the second fixation means are configured to be arranged on the first conductor and the second conductor, respectively.

10. The system according to of claim 5, wherein each of the first fixation means and the second fixation means comprise a first and a second clamping part from an electrically conductive material, respectively, wherein said first and second fixation means are configured to clamp said first and second clamping part against the first and the second conductor or against the second and the third conductor, respectively.

11. The system according to claim 1, further comprising at least a further switching means for electrically interconnecting the third conductor to a further third conductor of the one or more third conductors.

12. A measurement instrument for measuring a conduit surrounded by an insulator provided with a first conductor, a second conductor and an additional conductor arranged between the first conductor and the second conductor, wherein the additional conductor is intended to be grounded, the measurement instrument comprising a control and measuring circuit is configured to determine, in a first state, a first value which is representative of the capacitive coupling between the second conductor and the conduit and to determine, in a second state, a second value which is representative of the capacitive coupling between the first conductor and the second conductor.

13. The measurement instrument according to claim 12, wherein the control and measuring circuit comprises a measuring means having a first pole and a second pole, a first branch, a second branch and an additional branch connectable to the first conductor, the second conductor and the additional conductor, respectively; wherein the second branch is operably connected to the second pole; and wherein a switching circuit has a first terminal connected to the first pole, a second terminal connected to the first branch and an additional terminal connected to the additional branch; wherein the switching circuit is configured to connect the first terminal to the second terminal in a first switching state and to the additional terminal in a second switching state.

14. The measurement instrument according to claim 13, wherein the additional branch comprises a resistive component arranged between the additional conductor.

15. The measurement instrument according to claim 12, further comprising a control means configured for controlling the control and measuring circuit such that the measurements are performed in the first or second state.

16. The measurement instrument according to claim 12, wherein the control and measuring circuit is further configured to determine, in a third state, a third value which is representative of the capacitive coupling between the first conductor and the conduit.

17. The measurement instrument according to claim 12, further comprising a measurement instrument housing configured for accommodating the control and measuring circuit, a first fixation means, a second fixation means and an additional fixation means respectively attached to the measurement instrument housing, wherein the first fixation means, the second fixation means and the additional fixation means are configured to be arranged on the first conductor, the second conductor and the additional conductor, respectively.

18. The measurement instrument according to claim 17, wherein the measurement instrument housing comprises a first housing portion, a second housing portion, a control and measuring circuit housing portion accommodating the control and measuring circuit and a bridging portion connecting the first housing portion to the control and measuring circuit housing portion, wherein the first fixation means, the second fixation means and the additional fixation means are attached to the first housing portion, the second housing portion and the control and measuring circuit housing portion, respectively.

19. The measurement instrument according to claim 18, further comprising a first fixation means attached to the first housing portion, a second fixation means attached to the second housing portion, and an additional fixation means attached to the third housing portion wherein the first fixation means, the second fixation means and the additional fixation means are configured to be arranged on the first, second and additional conductor, respectively.

20. The measurement instrument according to claim 19, wherein each of the first fixation means, the second fixation means and the additional fixation means comprise a first, a second and an additional clamping part from an electrically conductive material, respectively, wherein said first, second and additional fixation means are configured to clamp said first, second and additional clamping part against the first, the second and the additional conductor, respectively.

\* \* \* \* \*